United States Patent
Schreter

(10) Patent No.: US 12,306,724 B2
(45) Date of Patent: May 20, 2025

(54) INCREMENTAL RECOVERY FOR A CLOUD DATABASE

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 61 days.

(21) Appl. No.: 18/348,506

(22) Filed: Jul. 7, 2023

(65) Prior Publication Data

US 2025/0013543 A1 Jan. 9, 2025

(51) Int. Cl.
*G06F 11/14* (2006.01)

(52) U.S. Cl.
CPC ...... *G06F 11/1469* (2013.01); *G06F 11/1451* (2013.01); *G06F 11/1464* (2013.01); *G06F 2201/80* (2013.01)

(58) Field of Classification Search
CPC ............. G06F 11/1469; G06F 11/1451; G06F 11/1464
See application file for complete search history.

(56) References Cited

U.S. PATENT DOCUMENTS

| | | |
|---|---|---|
| 9,633,051 B1 | 4/2017 | Maccanti et al. |
| 2011/0282839 A1* | 11/2011 | Paksoy ............... G06F 16/2272 707/E17.007 |
| 2014/0201161 A1* | 7/2014 | Kumarasamy ...... G06F 11/1469 707/679 |
| 2017/0075965 A1 | 3/2017 | Liu et al. |
| 2017/0228290 A1 | 8/2017 | Maccanti et al. |
| 2022/0382650 A1 | 12/2022 | Schreter |
| 2023/0004658 A1 | 1/2023 | Juch |

OTHER PUBLICATIONS

Communication: "Extended European Search Report", Dec. 17, 2024 (Dec. 17, 2024), European Patent Office, for European Application No. 24183432.4-1203 / 4488847, 11 pages.

* cited by examiner

*Primary Examiner* — Nadeem Iqbal
(74) *Attorney, Agent, or Firm* — Buckley, Maschoff & Talwalkar LLC

(57) ABSTRACT

Systems and methods include storage a backup of a first shard of a first database table of a database in a first backup location, the first shard including a first key range of the first database table, storage of a backup of a second shard of the first database table in a second backup location, the second shard including a second key range of the first database table, reception of an instruction to recover the database, and, in response to the instruction, recovery of the first shard to a first storage node from the first backup location and, in parallel, recover the second shard to a second storage node from the second backup location.

15 Claims, 19 Drawing Sheets

INCREMENTAL RECOVERY FOR A CLOUD DATABASE

BACKGROUND

Modern organizations often utilize a system landscape consisting of distributed computing systems providing various computing services. For example, an organization may deploy services within computing systems located in on-premise data centers (which themselves may be located in disparate geographic locations) and within data centers provided by one or more Platform-as-a-Service (PaaS) providers. The computing systems may comprise cloud-based computing systems (e.g., providing services using scalable-on-demand virtual machines).

In a Software-as-a-Service (SaaS) model, a service provider deploys a service (e.g., a database) onto cloud-based computing systems (which may in some instances be provided by a separate PaaS provider). The service may be used by a customer in exchange for payment of a fee to the service provider. The customer is not involved with the operation, management or scaling of the service, all of which are performed by the service provider.

In the case of a database provided "as a service", a service provider would like to ensure scalability on both the storage and the compute layers of the database. Some deployments disaggregate the storage and the compute layers by utilizing a separate cluster of nodes for each layer. This disaggregation (theoretically) allows independent scaling of each of the layers.

The storage layer of such a database service may consist of many storage nodes, each of which contains local disk space and computing resources (e.g., RAM and CPU) to execute a storage node process. Typically, the database service is a single-tenant system and all of the storage nodes of the storage layer in combination store a single database. Since each tenant requires a separate storage layer in such an implementation, these systems are cost-prohibitive for a small tenant. For larger tenants, the elasticity of such systems is unsuitable since the addition or deletion of individual storage nodes does not provide suitably-fine scaling increments.

The failure of a database instance results in a correlated failure of all tenants hosted on that database instance, referred to as a large "blast radius". Moreover, recovery of the data typically requires loading data of a large backup file from a cloud object store into memory and writing the data to the data and log volumes of one or more storage nodes. Networking resources are provisioned so as to provide suitable bandwidth during such data-intensive recovery operations. The resources are therefore inefficiently allocated (i.e., overprovisioned) for typical operational loads and result in wasted expenditure.

What is needed are systems to reduce time and resources required for recovery and for full redundancy after storage node failures.

DETAILED DESCRIPTION

Figure 1:
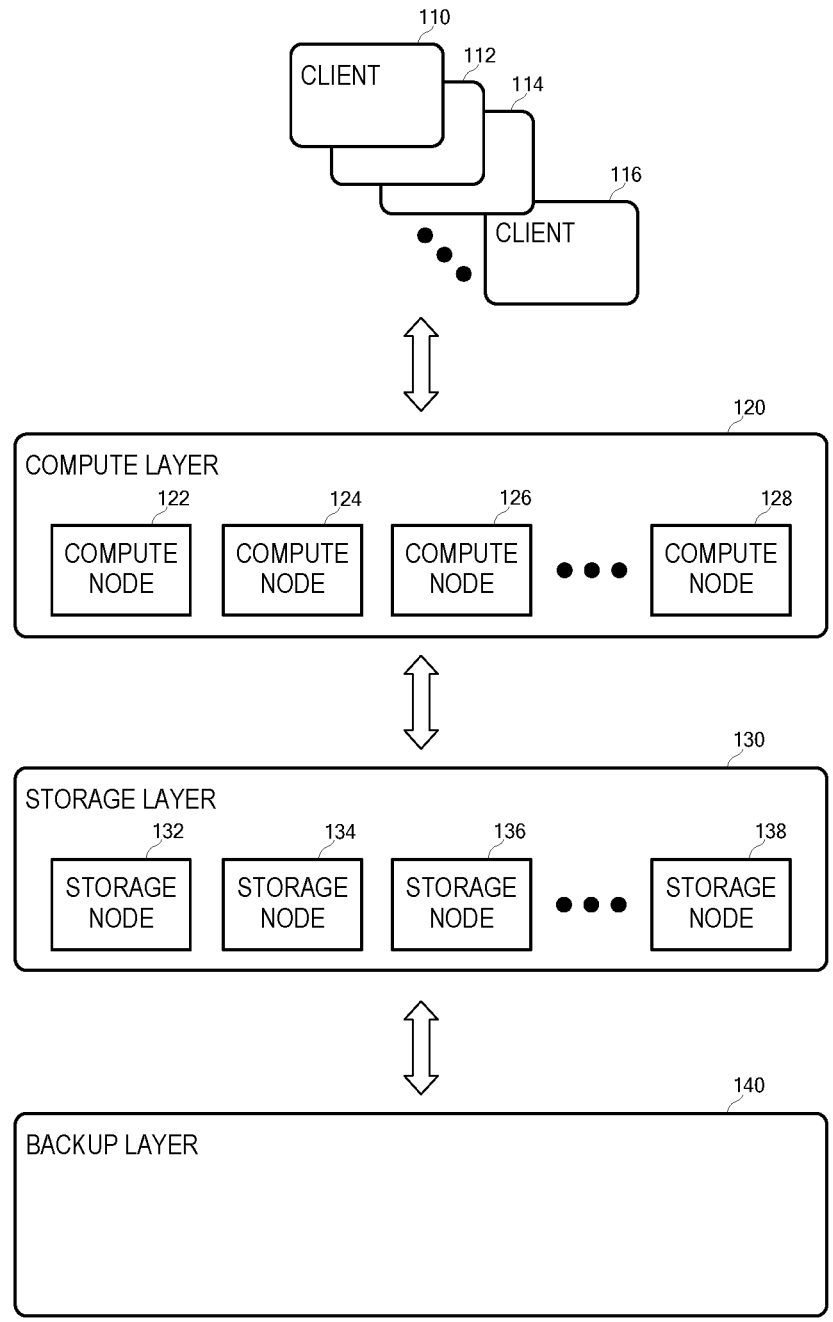
FIG. 1 illustrates a distributed database system according to some embodiments.

The following description is provided to enable any person in the art to make and use the described embodiments. Various modifications, however, will remain readily-apparent to those in the art.

According to some embodiments, the data of each tenant of a database system is logically split into shards and the shards of a given tenant are distributed across a plurality of storage nodes. The shards are large enough to amortize costs of operations on individual data items by allowing batch request processing, and small enough to allow suitably fast operations on entire shards (e.g., for backup/recovery, shard relocation). The shards may be substantially equally-sized and in the range of 1 GB-10 GB per shard in some embodiments.

Each shard stored on a storage node may be backed up to a backup layer implemented by an object storage service. The backup layer node may store backup data of one or more shards of each of one or more tenants. In one particular example, a system according to some embodiments may include a plurality of storage nodes which each store one or more shards of a given tenant, and a backup layer which stores the backup data of each of the shards of the given tenant in a separately-identifiable location.

Some embodiments may operate to receive a request to recover database tables of a database tenant to a database system. In response, the backup locations of all database table shards of the database tenant are identified. Next, all of the database table shards of the database tenant are recovered from the identified backup locations to a plurality of storage nodes of the database system.

Using a 1 GB/s connection between a storage layer and a backup layer, the systems described in the above Background are able to theoretically recover 1 TB of backup data to the storage layer in 17 minutes. In contrast, using a similar 1 GB/s backup layer-to-storage node bandwidth, some embodiments may complete the entire recovery process within seconds, particularly if the backup layer-to-storage node bandwidth is large in comparison to the size of the shard backups.

Some embodiments may also provide a recovery operation which allows near-instantaneous usage of the data to be recovered. According to this so-called incremental recovery, a request is received to recover database tables to a database system including a plurality of storage nodes. In response, metadata defining the shards of the database tables is recovered. The metadata may specify a tenant, a database table, a key range and a backup location associated with each shard. Recovery of the metadata may occur in less than one second.

Next, a request to perform a database operation on one or more shards is received from a database frontend. Based on the shard metadata, it is determined whether the one or more shards have already been recovered to storage nodes of the database system. Assuming that none of the one or more shards has been recovered, the shard(s) are recovered from the backup location(s) associated with the shard(s) in the metadata and the metadata is updated to specify the storage node(s) in which the shard(s) are now stored. Identifiers of the one or more storage nodes are provided to the database frontend, and the database frontend uses the identifier(s) to transmit a request to each of the one or more storage nodes to perform the operation on the one or more shards. Accordingly, using incremental recovery, shards are recovered "on demand" and are available for use almost instantaneously.

To achieve high availability, each recovered shard can be replicated multiple times among disparate storage nodes. The relatively small size of the shards and large node-to-node bandwidth allow such replication to proceed within seconds in some embodiments. Upon the failure or decommissioning of a storage node, the data of all shards stored by that storage node remains accessible via the replicas of those shards which are stored on other storage nodes. Further, since the replicas of the shards are normally distributed across the remaining storage nodes, the remaining nodes are able to generate new replicas to restore full redundancy. For example, a replica of each shard may be transmitted from its storage node to a new storage node. When the shards of a database are distributed over many storage nodes, the re-replication of data to restore full redundancy of the database may proceed in parallel across all nodes (i.e., using non communication rather than 1:1 communication). In contrast, other systems require redistribution of an entire database and/or copying of the data of an entire node over the network to adjust for a failed node.

FIG. 1 illustrates a system according to some embodiments. The illustrated components of FIG. 1 may be implemented using any suitable combinations of computing hardware and/or software that are or become known. Such combinations may include cloud-based implementations in which computing resources are virtualized and allocated elastically. In some embodiments, two or more components are implemented by a single computing device.

Clients 110-116 may comprise computing systems executing applications or services which issue database queries. Clients 110-116 may issue the database queries in response to requests input thereto by users (not shown). Compute layer 120 receives the queries (e.g., via APIs provided by compute layer 120) and operates in conjunction with database data stored within storage layer 130 to provide corresponding query results to clients 110-116.

Compute layer 120 includes a plurality of compute nodes 122-128. Similarly, storage layer 130 includes a plurality of storage nodes 132-138. Each of nodes 122-128 and 132-138 includes at least one processing unit (e.g., a CPU), random access memory, and at least one data storage device (e.g., an NVMe SSD), and may comprise a single computer server, a group of computer servers, a virtual machine and any other combination that is or becomes known. In some embodiments, compute layer 120 is fully stateless and booted over the network, therefore compute nodes 122-128 are not required to include a storage device.

In some embodiments, compute layer 120 and storage layer 130 are implemented by a Kubernetes cluster. Kubernetes is an open-source system for automating deployment, scaling and management of containerized applications. A Kubernetes cluster consists of many nodes, which in turn may comprise physical servers and/or virtual machines. A node executes an application within a software container. One or more containers may be grouped into a pod, where each container of a given pod shares the same computing resources and local network.

Backup layer 140 provides object storage to storage layer 130. Each storage node 132-138 of storage layer may store its block-based data as objects within backup layer 140. Backup layer 140 may provide object storage through a web service interface in some embodiments. Backup layer 140 may comprise an object store service provided by a hyperscaler (e.g., AWS S3). Storage layer 130 identifies a shard backup stored in layer 140 via an abstract backup location identifier. In some embodiments, the backup location identifier may comprise a composition of a corresponding tenant ID, shard ID and version counter.

According to some embodiments, FIG. 1 represents a single-tenant database system. Storage nodes 132-138 store data associated with a single tenant and compute nodes 122 handle queries received from clients 110-116 operated by users of the single tenant. As mentioned above, each of storage nodes 132-138 stores respective shards of the data associated with the single tenant so as to provide parallelization and elasticity.

Each of storage nodes 132-138 may store backup data of each of its respective shards to backup layer 140. In a case that storage nodes 132-138 store multiple replicas of each shard of the database, backup data of only one replica of each shard may be stored in backup layer 140.

FIG. 1 may represent a multi-tenant database system in some embodiments. In such an implementation, storage nodes 132-138 store data associated with multiple tenants. The data is stored in shards which are distributed across storage nodes 132-138. Each of compute nodes 122-128 may execute a tenant-specific single-tenant database instance. Accordingly, in a case that client 110 is being accessed by a user of a first tenant, queries issued by client 110 are directed to the one of compute nodes 122-128 which is associated with the first tenant.

In yet another example, storage nodes 132-138 store data associated with multiple tenants, and each of compute nodes 122-128 executes a multi-tenant database instance. Accordingly, any of compute nodes 122-128 are capable of handling queries received from clients 110-116 regardless of the tenant whose data is being queried. In the case of a multi-tenant database system, storage nodes 132-138 store backup data of each shard of each tenant database in backup layer 140. Accordingly, backup layer 140 may store backup data of one or more shards of one or more tenant databases.

Figure 2:
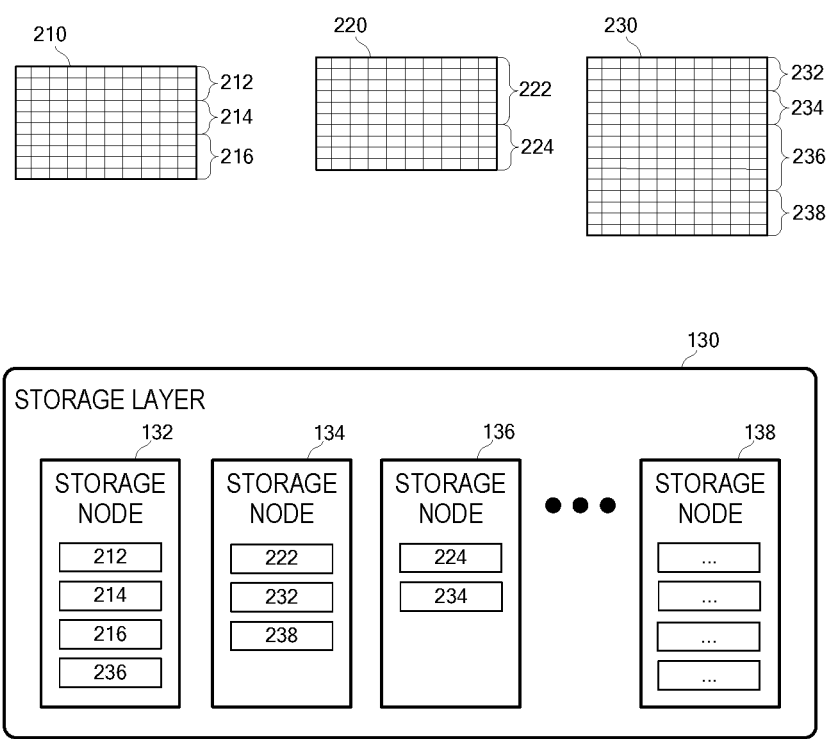
FIG. 2 illustrates storage of database table shards on a plurality of storage nodes according to some embodiments.

FIG. 2 illustrates storage of database table shards of a single tenant on a plurality of storage nodes according to some embodiments. Database tables 210, 220 and 230 are logical representations of data associated with a given database tenant. Database tables 210, 220 and 230 may conform to a particular schema as is known in the art. According to some embodiments, each row of each of database tables 210, 220 and 230 includes values describing an instance of an object. Embodiments are not limited to any types of objects.

Each of database tables 210, 220 and 230 is split into multiple shards. Specifically, database table 210 is split into shards 212, 214 and 216, database table 220 is split into shards 222 and 224, and database table 230 is split into shards 232, 234, 236 and 238. Each shard is associated with a key range. The shards may be substantially equally-sized and the size of each shard may be between 1 GB and 10 GB in some embodiments. Embodiments include any algorithm for splitting a table into shards and for defining the key ranges of the shards. In one implementation, storage layer 130 is a key/value store and the key range of a shard is the key range of stored keys in that shard. According to some embodiments, a shard may include data of more than one database tables.

According to the present example, the shards are stored across storage nodes 132, 134 and 136 of storage layer 130. Storage node 132 stores shards 212, 214, 216 and 236, storage node 134 stores shards 222, 232 and 238, and storage node 136 stores shards 224 and 234. It is assumed that storage node 138 and any other storage nodes of storage layer 130 store shards of other unshown database tables of the tenant.

The distribution of the shards across the storage nodes of storage layer 130 may be based on any suitable algorithm. Since storage node 132 stores all shards 212, 214, 216 of table 210, failure of node 132 results in inaccessibility of all of the data of table 210. In some embodiments, each shard of a table is preferably stored on a different node (e.g., shards 222 and 224 of table 220), such that failure of a node results in inaccessibility of at most one shard of the table. Some embodiments may store at most one shard of a given tenant per storage node.

Figure 3:
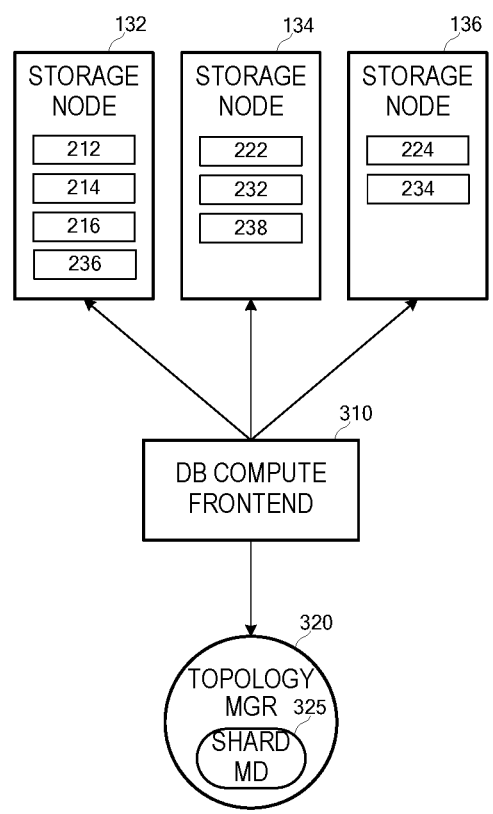
FIG. 3 illustrates access to database table shards according to some embodiments.

FIG. 3 illustrates access to database table shards according to some embodiments. Database compute frontend 310 may comprise a database instance executing on a compute node as described above. Database compute frontend 310 may need to access database table data in response to a query received from a client. However, due to the shard storage described above, database compute frontend 310 must initially determine the location of the shards containing the desired data in order to direct its requests to the appropriate storage node(s).

Topology manager 320 consists of one or more nodes which store shard metadata 325. Shard metadata 325 may be associated with a well-known ID in the system and be stored in one or more storage nodes 132 through 136 in the same manner as the other shards stored herein. According to some embodiments, shard metadata 325 specifies the storage locations of the database shards. For example, shard metadata 325 may identify each shard by a table id and a key range. Moreover, each shard is also associated with an identifier of a storage node on which it is stored. Accordingly, database compute frontend 310 queries topology manager 320 for the location of the shards associated with a query (e.g., all shards of a given table) and receives in return an indication of the storage node(s) in which the desired shard(s) are stored. Database compute frontend 310 then issues database operations to the node(s) on which the shard(s) are stored. As described above, the operations may advantageously be performed in parallel if the shards are located on more than one storage node.

In some embodiments, creation of a tenant causes creation of a single shard on a storage node. This shard may be considered a root shard which, rather than topology manager 320, includes shard metadata 325 associated with the tenant. Therefore, in response to a received query, database compute frontend 310 queries topology manager for the location of the root shard of the tenant associated with a query, retrieves the shard metadata from the root shard, and determines the storage node(s) in which the desired shard(s) are stored based thereon.

Figure 4:
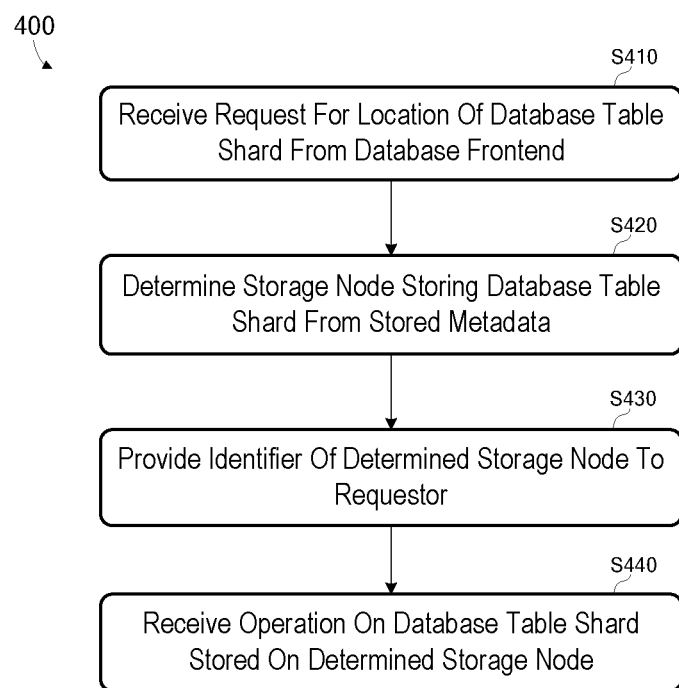
FIG. 4 is a flow diagram of a process to access database table shards on storage nodes according to some embodiments.

FIG. 4 is a flow diagram of process 400 to access database table shards on storage nodes according to some embodiments. Process 400 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Process 400 assumes the prior storage of database table shards on multiple storage nodes as described above. At S410, a request is received for the location of a database table shard. The request may identify the shard using a database table identifier and one or more primary keys (or a primary key range) of the identified table. The request is received from a database frontend, which may be executing on a compute node of a compute layer as described above. The shard may include data required to serve a query received from a client application by the database frontend.

In response to the request, a storage node storing the shard is determined based on stored metadata. According to some embodiments, the stored metadata is shard metadata stored by a topology manager as described above. Such a topology manager may therefore receive the request at S410 and determine the storage node based on the request and the shard metadata at S420. In one example, the request includes a database table identifier and a primary key range. The topology manager may determine a shard which includes the primary key range of the identified table based on the shard metadata at S420, and further determine a storage node storing the shard based on the shard metadata. In some embodiments, S420 includes determination of a root shard of a tenant associated with the query and determination of the storage node(s) in which the desired shard(s) are stored based on metadata stored in the root shard. An identifier of the determined storage node(s) is provided to the requestor at S430.

It may be determined at S420 that the primary key range spans two or more shards, in which case the storage nodes storing the two or more shards are determined at S420. In another example, the request includes only a table identifier and no primary keys or key range. Accordingly, S420 includes determination of all shards of the identified table and their corresponding storage nodes. The received request may include any number of table identifiers and associated key ranges.

A database operation on the shard is received at the database node on which the shard is stored at S440. The database operation may be issued by the database frontend from which the request was received at S410, and may utilize the identifier provided at S430. If more than one storage node has been identified, a database operation may be issued to and received at each other node at S440, thereby enabling parallel execution of the operations by the more than one storage nodes.

Figure 5A:
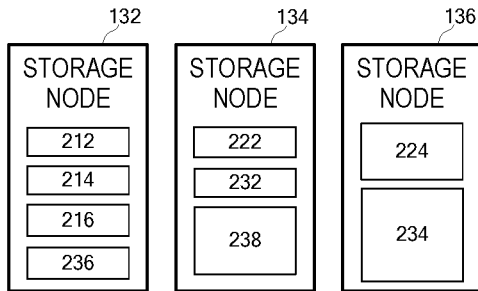
FIGS. 5a through 5c illustrate a scale-out process according to some embodiments.
Figure 5B:
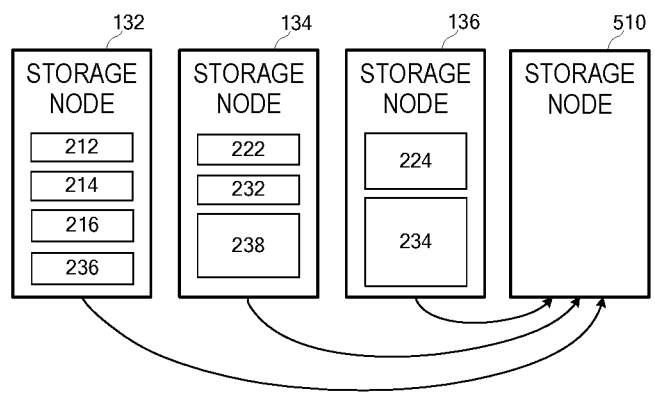
Figure 5C:
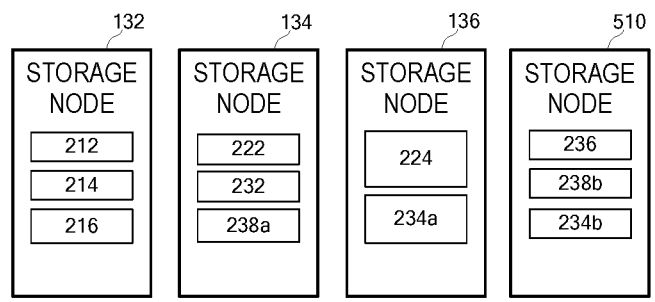

FIGS. 5a through 5c illustrate a scale-out process according to some embodiments. Storage nodes 132, 134 and 136 of FIG. 5a store respective shards, some of which have grown in size with respect to FIG. 3. It may therefore be manually or automatically (based on resource consumption parameters) determined to reduce the amount of storage consumed by one of the storage nodes by adding another storage node to the corresponding storage layer. Such a determination may be performed by a topology manager according to some embodiments. It may also or alternatively be determined to divide shards 234 and 238 because their size exceeds a specified maximum shard size.

FIG. 5b illustrates the addition of storage node 510 to the storage layer. FIG. 5b also illustrates the movement of shards from each of storage nodes 132, 134 and 136 to storage node 510. The movement may be intended to achieve load balancing which reducing the memory consumption per node.

FIG. 5c illustrates the resulting storage layer. As shown, shard 236 has moved from storage node 132 to storage node 510. Shard 238 has been divided into shards 238a and 238b and shard 238b has moved from storage node 134 to storage node 510. Similarly, shard 234 has been divided into shards 234a and 234b and shard 234b has moved from storage node 136 to storage node 510. Embodiments are not limited to division of a shard into equally-sized shards.

Advantageously, the shards moved to node 510 are each moved over different (and substantially independent) node-to-node network connections. Movement of the shards therefore may occur substantially faster than in a case where all three shards travel from a single node to node 510. Moreover, this movement only requires the nodes from which the shards are moved to use 1/n of their respective bandwidth. Consequently, impact on node performance and system response time is minimal.

Division of a shard and movement of the resulting shards may occur with or without the addition of a storage node. Addition of a storage node and movement of shards thereto may also occur with or without dividing any shards.

Figure 6A:
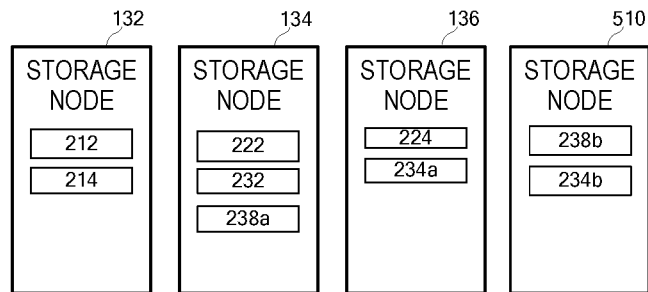
FIGS. 6a through 6c illustrate a scale-in process according to some embodiments.
Figure 6B:
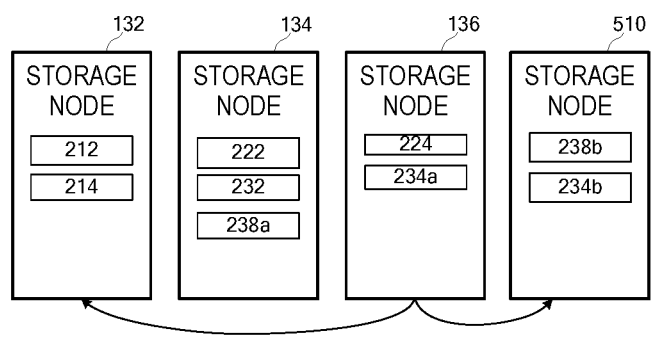
Figure 6C:
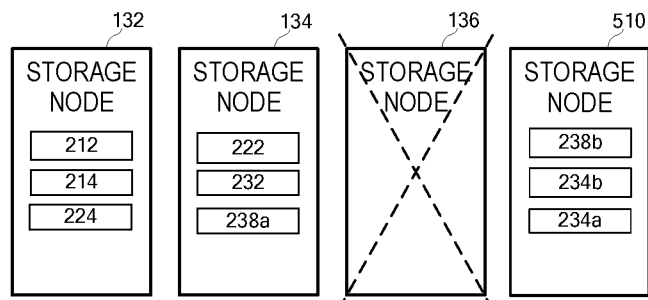

FIGS. 6a through 6c illustrate a scale-in process according to some embodiments. FIG. 6a illustrates storage nodes 132, 134, 136 and 138 in which some shards are smaller than shown in FIG. 5c. It may therefore be manually or automatically (again, based on resource consumption parameters) determined to reduce the number of storage nodes of the corresponding storage layer. This determination may be performed by a topology manager according to some embodiments.

In the present example, it is determined to decommission storage node 136. Accordingly, FIG. 6b illustrates the movement of the shards of storage node 136 to storage nodes 132 and 510. The storage nodes to which the shards are moved are determined so as to achieve load balancing in some embodiments.

FIG. 6c illustrates the resulting storage layer, in which shard 224 has moved from storage node 136 to storage node 132 and shard 234a has moved from storage node 136 to storage node 510. Storage node 136 no longer stores any shards and may therefore be decommissioned. According to some embodiments, scaling-in may also or alternatively include merging two or more small shards into one shard, and placing the one shard on a storage node based on load balancing and resource consumption considerations. Due to the key range associated with each shard, shards should only be merged with shards that are associated with an adjacent key range according to some embodiments.

Figure 7:
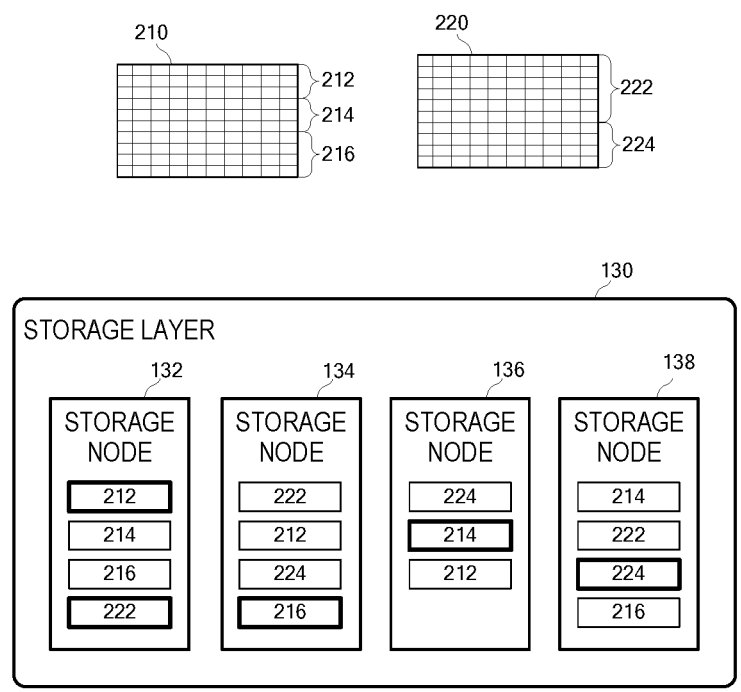
FIG. 7 illustrates storage of database table shard replicas on a plurality of storage nodes according to some embodiments.

FIG. 7 illustrates storage of database table shard replicas of a single tenant on a plurality of storage nodes according to some embodiments. As described with respect to FIG. 2, database tables 210 and 220 and 230 are logical representations of data associated with a given database tenant and are split into multiple shards associated with different key ranges.

As shown in FIG. 7, storage layer 130 store multiple replicas of each of shards 212, 214, 216, 222 and 224. Replication may be performed in any suitable manner such as by using a consensus protocol, employing erasure codings across replicas, etc., each of which may exhibit different advantages and disadvantages based on the use case. The distribution of the replicas across the storage nodes of storage layer 130 may be based on any suitable-algorithm which may provide load-balancing and high availability.

Although three replicas per shard are illustrated in FIG. 7, embodiments may utilize any number of replicas. In the case of a protocol which replicates each shard across three different storage nodes, the data of a particular shard remains fully accessible if one of the three storage nodes serving this shard fails or is decommissioned. If the replication factor is set greater than three, then the system continues normal operation even in the case of multiple node failures (e.g., two node failures using a replication factor of five, or in general k node failures with a replication factor of 2k+1).

FIG. 7 reflects a consensus protocol in which each shard is represented by a leader replica and two follower replicas. The leader replica is determined by a leader election algorithm and is denoted by a pronounced outline in FIG. 7. All operations on a given shard are directed to the storage node which stores the leader replica of the shard, and changes thereto are replicated to the follower replicas of the shard. If a node including a leader replica of a shard fails, one of the remaining follower replicas of the shard is designated the leader replica and the new leader replica begins to replicate its changes to the remaining follower replicas. Moreover, as will be described below, a new follower replica is quickly instantiated on another (or new) storage node to reestablish the desired consensus protocol.

Figure 8:
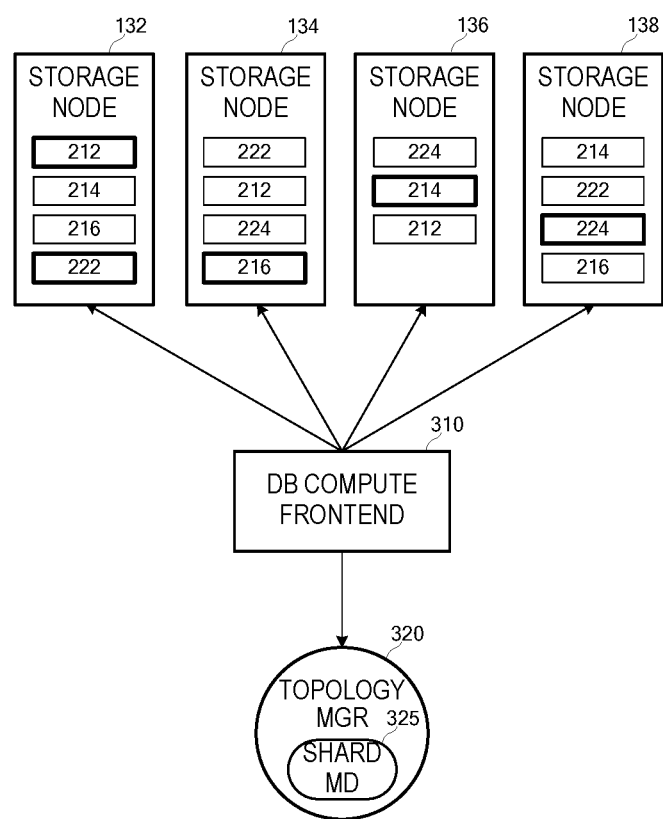
FIG. 8 illustrates access to database table shards according to some embodiments.

FIG. 8 illustrates access to leader replicas of shards according to some embodiments. Database compute frontend 310 determines the location of the leader replicas of shards containing the desired data in order to direct its requests to the appropriate storage node(s). Shard metadata 325 of topology manager 320 specifies the storage locations of all replicas of each shard and notes the current leader replica of each shard. If a storage node including a leader replica of a shard fails or is decommissioned, a new leader replica of the shard is elected and shard metadata 325 is updated accordingly. Any follower replicas stored on the failed/decommissioned storage node are removed from shard metadata 325. Shard metadata 325 also specifies a table ID and a key range of each shard.

Accordingly, database compute frontend 310 queries topology manager 320 for the location of the shards associated with a query (e.g., all shards of a given table) and receives therefrom an identifier of the storage node(s) in which the leader replicas of the desired shard(s) are stored. Database compute frontend 310 then issues database operations to the node(s) on which the leader replicas shard(s) are stored. Again, the operations may advantageously be performed in parallel if the shards are located on more than one storage node.

Database compute frontend 310 may also receive identifiers of the storage nodes in which the follower replicas of the desired shard(s) are stored. Accordingly, if an operation to an identified leader replica fails, database compute frontend 310 may seamlessly retry the operation on one of the corresponding follower replicas stored on a different storage node.

In some embodiments, a root shard stores shard metadata 325 instead of topology manager 320, and topology manager 320 merely stores the location of the root shard. The root shard may also be stored among storage nodes 132-138 in multiple replicas, in which case topology manager 320 stores the location of each replica.

Figure 9A:
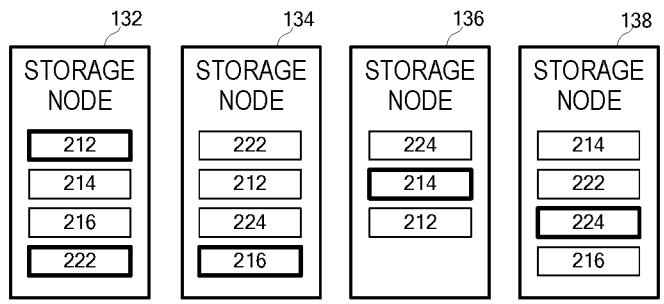
FIGS. 9a through 9c illustrate a scale-out process using database table shard replicas according to some embodiments.
Figure 9B:
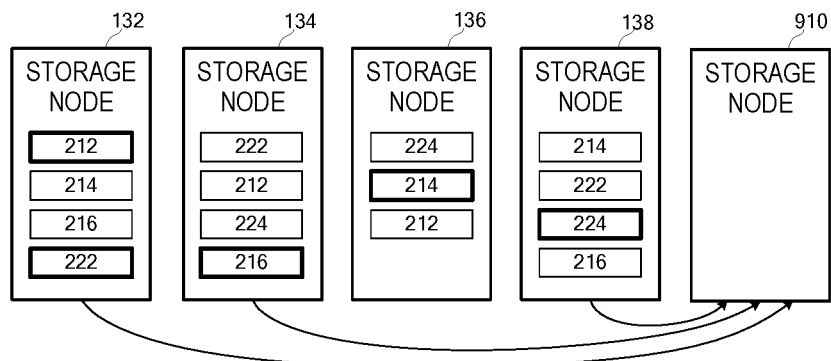
Figure 9C:
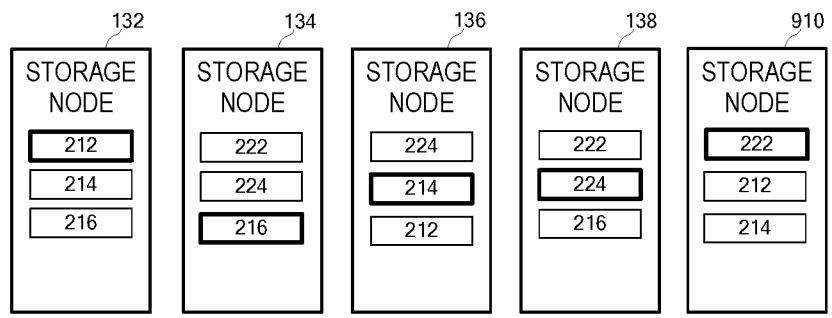

FIGS. 9a through 9c illustrate a scale-out process using database table shard replicas according to some embodiments. Storage nodes 132, 134, 136 and 138 of FIG. 9a store respective shards as shown in FIGS. 7 and 8. It will be assumed that it is manually or automatically determined to add another storage node to the corresponding storage layer to, for example, reduce the amount of storage consumed by one of the storage nodes or provide improved availability.

FIG. 9b illustrates the addition of storage node 910 to the storage layer. As also illustrated in FIG. 9b, shards are moved from each of storage nodes 132, 134 and 138 to storage node 910. FIG. 9c illustrates the resulting storage layer. Shard 222 has moved from storage node 132 to storage node 910, shard 212 has moved from storage node 134 to storage node 910, and shard 214 has moved from storage node 138 to storage node 910. In all examples described herein, shard metadata 325 is updated to reflect new replica storage locations due to movement of shards between storage nodes.

The shards are moved to node 910 over different (and substantially independent) node-to-node network connections (i.e., 132 to 910, 134 to 910 and 138 to 910). By copying one shard rather than three, nodes 132, 134 and 138 are respectively taxed much less than other implementations.

Figure 10A:
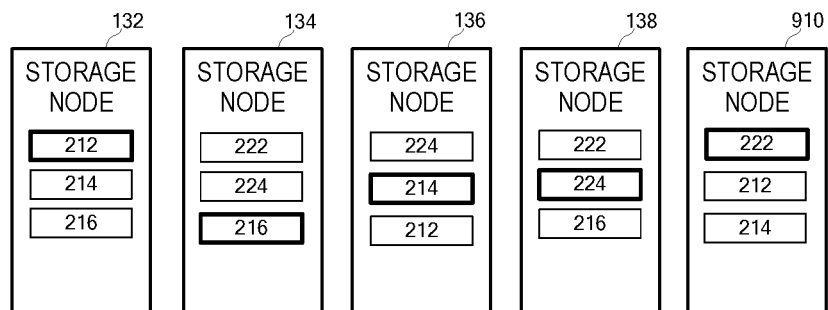
FIGS. 10a through 10c illustrate a scale-in process using database table shard replicas according to some embodiments.
Figure 10B:
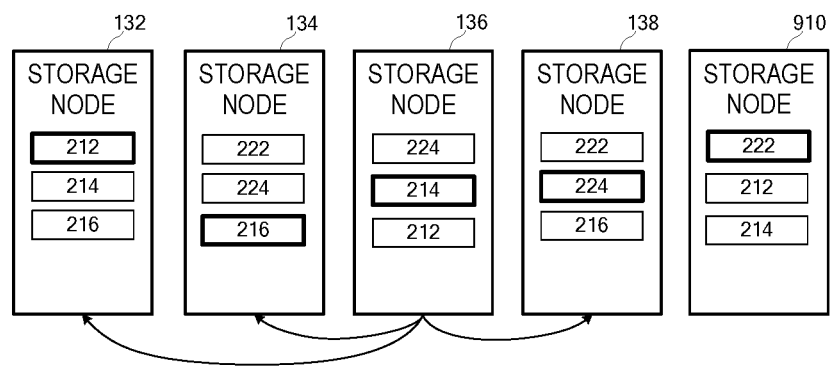
Figure 10C:
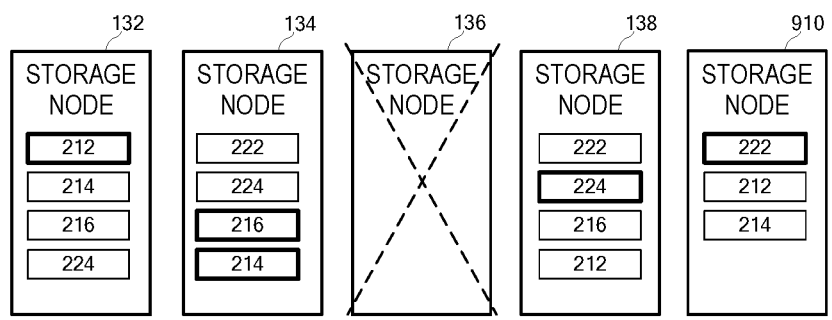

FIGS. 10a through 10c illustrate a scale-in process using database table shard replicas according to some embodiments. FIG. 10a reflects a storage layer as described with respect to FIG. 9c. It will be assumed that it is manually or automatically determined to decommission storage node 136, perhaps based on under-utilization of one or more storage nodes of the depicted storage layer.

FIG. 10b illustrates the movement of the shards of storage node 136 to storage nodes 132, 134 and 138. The shards to be moved and the storage nodes to which the shards are moved may be determined based on a load-balancing and/or resource consumption algorithm in some embodiments. FIG. 10c illustrates the resulting storage layer, in which shard 224 has moved from storage node 136 to storage node 132, shard 214 has moved from storage node 136 to storage node 134, and shard 212 has moved from storage node 136 to storage node 138. Since storage node 136 no longer stores any shards, it may be decommissioned. Shard metadata 325 is then updated to reflect new replica storage locations due to the above-described movement of shards between storage nodes.

Figure 11A:
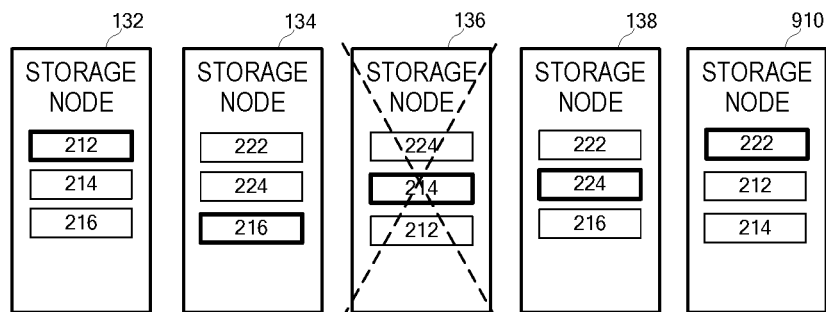
FIGS. 11a through 11c illustrate a recovery process using database table shard replicas according to some embodiments.
Figure 11B:
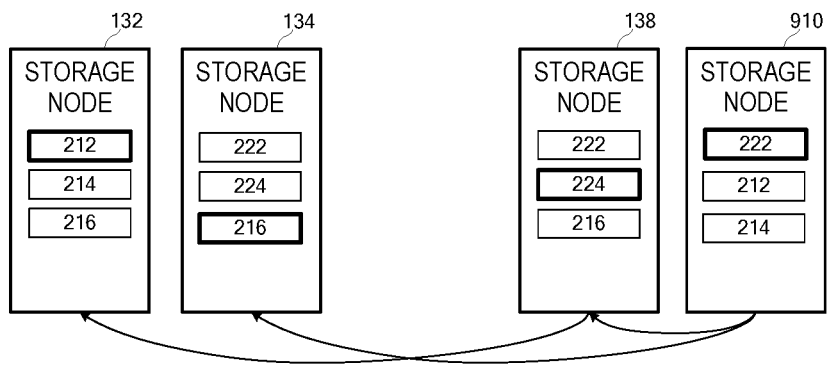
Figure 11C:
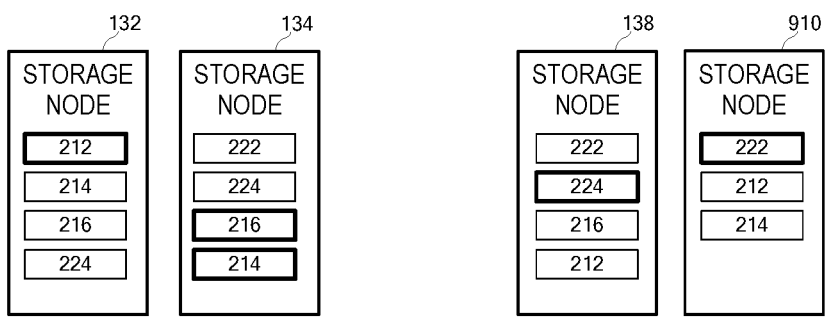

FIGS. 11a through 11c illustrate a recovery process using database table shard replicas according to some embodiments. FIG. 11a reflects a storage layer as described with respect to FIG. 10a, but in this case it is assumed that storage node 136 unexpectedly fails. In some implementations, decommissioning of node 136 may also proceed as described below with respect to FIGS. 11a-11c.

Upon detecting the failure, topology manager 320 accesses shard metadata 325 to determine the shards which were stored on storage node 136. Next, topology manager 320 identifies, based on shard metadata 325, which of the remaining storage nodes stores replicas of the shards which were stored on storage node 136. Topology manager 320 then instructs the storage layer to copy a replica of each of the shards which were stored on storage node 136 from a remaining storage node to a different remaining storage node.

FIG. 11b illustrates the copying of the replicas of each of the shards which were stored on failed storage node 136 to other storage nodes. For example, shard metadata 325 indicates that failed storage node 136 stored replicas of shards 224, 214 and 212, and that the replica of shard 214 was a leader replica. Shard metadata 325 also indicates that replicas of shard 224 are located on nodes 134 and 138, replicas of shard 214 are located on nodes 132 and 910, and replicas of shard 212 are located on nodes 132 and 910. Accordingly, FIG. 11b illustrates the copying of shard 224 from node 138 to node 132, of shard 214 from node 910 to node 134, and of shard 212 from node 910 to node 138. As noted above, copying between different sets of nodes allows each copy operation to proceed in parallel and to use the full available node-to-node bandwidth. FIG. 11c illustrates the resulting storage layer after completion of the copy operations.

The particular storage nodes from and to which the shards are copied may be determined based on a load-balancing and/or resource consumption algorithm according to some embodiments. Shard metadata 325 is updated to reflect the new replica storage locations. The update may also include election of the replica of shard 214 stored in node 134 as the leader replica, and indication of the election in shard metadata 325.

Figure 12:
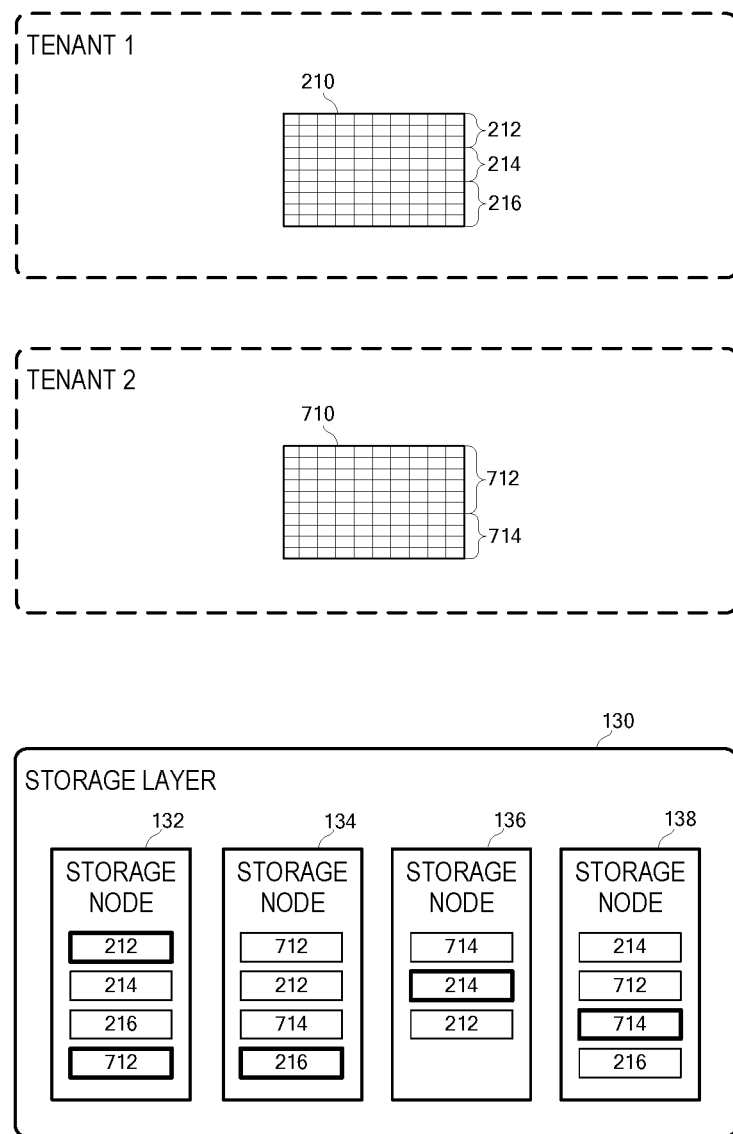
FIG. 12 illustrates storage of database table shard replicas of multiple tenants on a plurality of storage nodes according to some embodiments.

FIG. 12 illustrates storage of database table shard replicas of multiple tenants on a plurality of storage nodes according to some embodiments. Database table 210 includes data of Tenant 1 and database table 710 includes data of Tenant 2. Database table 210 conforms to a schema associated with Tenant 1 and database table 710 conforms to a schema associated with Tenant 2. Each tenant may be associated with many other database tables including their respective data. As is known in the art, the data of Tenant 1 is intended to be accessible only to users of Tenant 1 and the data of Tenant 2 is intended to be accessible only to users of Tenant 2.

In the illustrated example, table 210 is divided into shards 212, 214 and 216, and table 710 is divided into shards 712 and 714. Storage layer 130 stores multiple replicas of each of shards 212, 214, 216, 712 and 714 as described above with respect to FIG. 7. FIG. 12 represents a consensus protocol consisting of a leader replica (i.e., denoted by a pronounced outline) and two follower replicas for each shard. The replicas may be distributed across the storage nodes of storage layer 130 based on any suitable algorithm for providing load-balancing and high availability. Scale-out, scale-in, and failure recovery of the nodes shown in FIG. 12 may proceed in the manners described above with respect to FIGS. 9*a*-9*c*, 10*a*-10*c* and 11*a*-11*c*.

Figure 13:
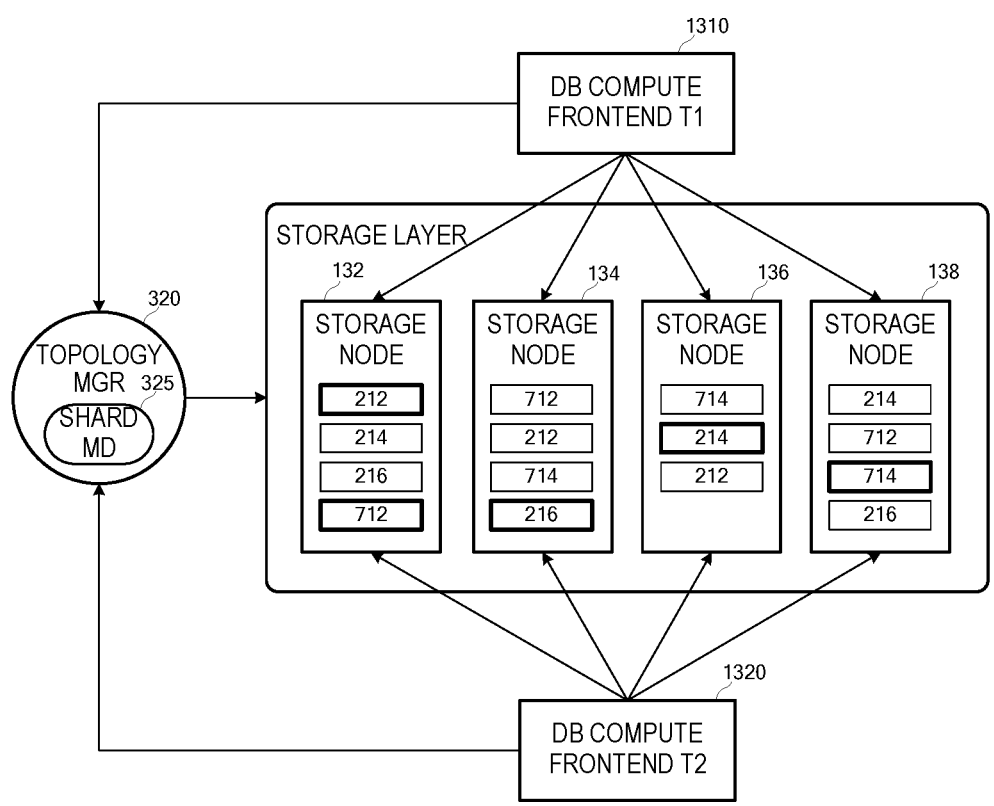
FIG. 13 illustrates access to database table shards of multiple tenants according to some embodiments.

FIG. 13 illustrates access to database table shards of multiple tenants according to some embodiments.

Database compute frontend 1310 serves users of Tenant 1 and database compute frontend 1320 serves users of Tenant 2. Database compute frontend 1310 may comprise a single-tenant database instance executing on a single compute node of a compute layer, and database compute frontend 1320 may comprise a single-tenant database instance executing on another single compute node of the compute layer. In some embodiments, database compute frontend 1310 and database compute frontend 1320 execute on a same compute node.

Topology manager 320 may operate as described above. As also described above, shard metadata 325 may associate each shard with a table identifier, a key range, locations of each replica, and an identifier of a leader replica. However, since table 210 and table 710 conform to different schemas, table identifiers and key ranges of the tables of Tenant 1 might overlap/conflict with table identifiers and key ranges of the tables of Tenant 2. Accordingly, shard metadata 325 also associates each shard with a tenant identifier. If database compute frontends 1310 and 1320 are single-tenant database frontends, the tenant identifier may be an identifier of the container in which the frontends are executing.

In response to a received query, database compute frontend 1310 (or frontend 1320) queries topology manager 320 for the location of the shard(s) associated with the query. The query of topology manager 320 includes a tenant identifier, a table identifier, and a key range (e.g., as a concatenated string). Topology manager 320 determines an identifier of the storage node(s) in which the leader replicas of the desired shard(s) are stored based on the query received from database compute frontend 1310 (or frontend 1320) and shard metadata 325. Database compute frontend 1310 (or frontend 1320) then issues database operations to the node(s) on which the leader replicas shard(s) are stored. The storage nodes may perform these operations in parallel if the shards are located on more than one storage node.

In some embodiments, each tenant is associated with a root shard which includes the shard metadata for the tenant, and topology manager 320 stores the location of the root shard for each tenant. Database compute frontend 1310 or 1320 may therefore query topology manager 320 for the storage node which stores the root shard of a given tenant, read the metadata of the root shard from the storage node, and determine locations of desired shards based on the metadata. Each root shard may also be stored among storage nodes 132-138 in multiple replicas, in which case topology manager 320 stores the location of each replica of each root shard.

Some embodiments include a multi-tenant database compute frontend which serves users of Tenant 1 and users of Tenant 2. The multi-tenant database compute frontend accesses shard replicas as described above with respect to both database compute frontend 1310 and database compute frontend 1320, using an appropriate tenant identifier to query topology manager 320.

Figure 14:
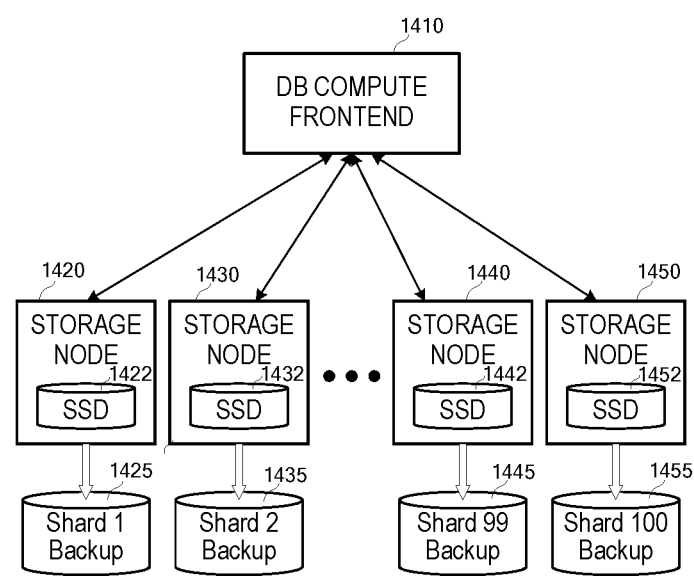
FIG. 14 illustrates storage of shard backups from a plurality of storage nodes to a plurality of backup locations according to some embodiments.

FIG. 14 illustrates storage of shard backups from a plurality of storage nodes to a backup layer according to some embodiments. Storage nodes 1420, 1430, 1440 store shards are in their respective storage devices 1422, 1432, 1442 and 1452 as described above. Database compute frontend 1410 accesses various ones of storage nodes 1420, 1430, 1440 and 1450 to perform operations on the shards stored therein.

For the sake of simplicity, it is assumed that each of storage nodes 1420, 1430, 1440 and 1450 stores a respective single shard of a single tenant database. Moreover, from time-to-time during operation, and as is known in the art, each of storage nodes 1420, 1430, 1440 and 1450 stores backup data of its respective shard into a respective one of backup locations 1425, 1435, 1445 and 1455. The stored backup data may comprise a snapshot and/or a snapshot and corresponding logs as is known in the art. The backup data may comprise object data suitable for storage in backup locations 1425, 1435, 1445 and 1455, rather than block-based data. Embodiments are not limited to the one-to-one correspondence between storage nodes and shards.

Figure 15:
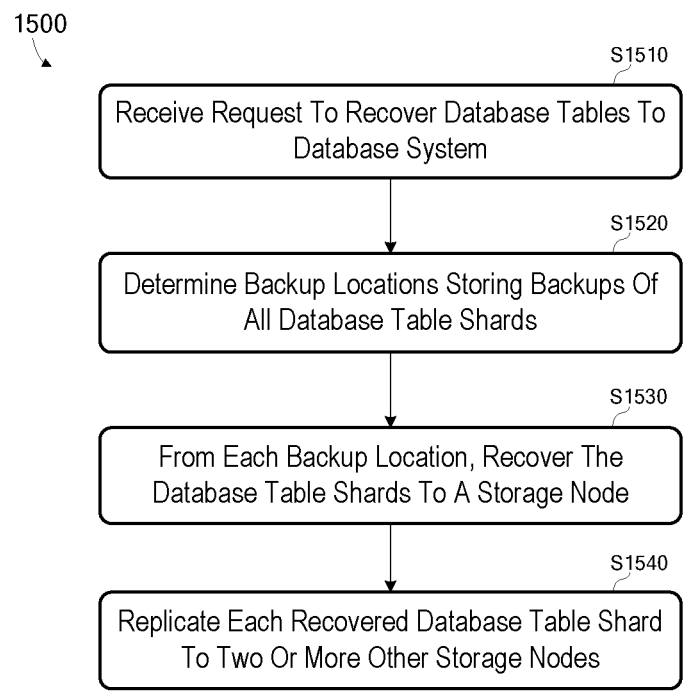
FIG. 15 is a flow diagram of a process to recover shard backups to storage nodes according to some embodiments.

FIG. 15 is a flow diagram of process 1500 to recover shard backups stored in a backup layer including backup locations 1425, 1435, 1445 and 1455 according to some embodiments. Initially, at S1510, a request may be received to recover database tables to a database system. The request may be issued by an administrator in response to a database crash or for any other suitable reason.

Figure 16:
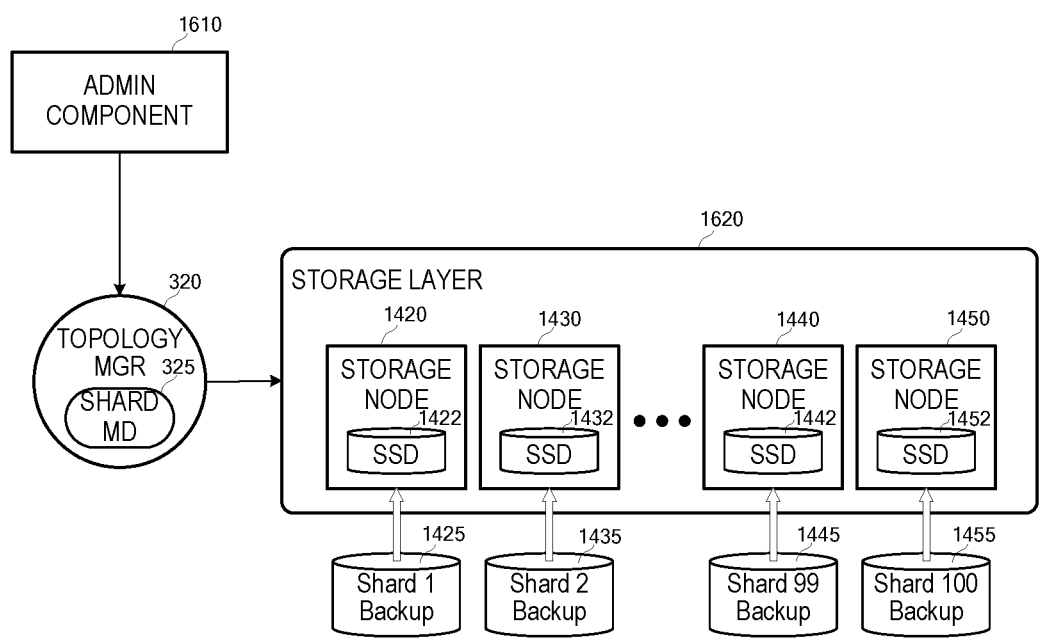
FIG. 16 illustrates recovery of shard backups to storage nodes according to some embodiments.

FIG. 16 illustrates recovery of shard backups to storage nodes according to some embodiments of process 1500. An administrator may interact with a user interface of administrator component 1610 to submit an instruction to recover the database tables of a database tenant from corresponding backup data.

In response, at S1520, topology manager 320 determines the backup locations (i.e., location IDs) which store backup data of each shard of each of the database tables. The determination may be based on shard metadata 325. Next, topology manager 320 instructs storage layer 1620 to recover each shard from its backup location. Accordingly, at S1530, the database table shards are recovered from each of the determined backup locations to storage nodes of storage layer 1620. Shard metadata 325 may specify the storage node corresponding to each shard. Recovery may comprise storage of a snapshot in a storage node and replay of any corresponding logs.

In some embodiments, each database table shard recovered on a given storage node is replicated to two or more other storage nodes. Such replication may occur before or after the recovered shards are made available for frontend consumption. Shard replication and management of the replicas during operation may proceed as described above.

Figure 17:
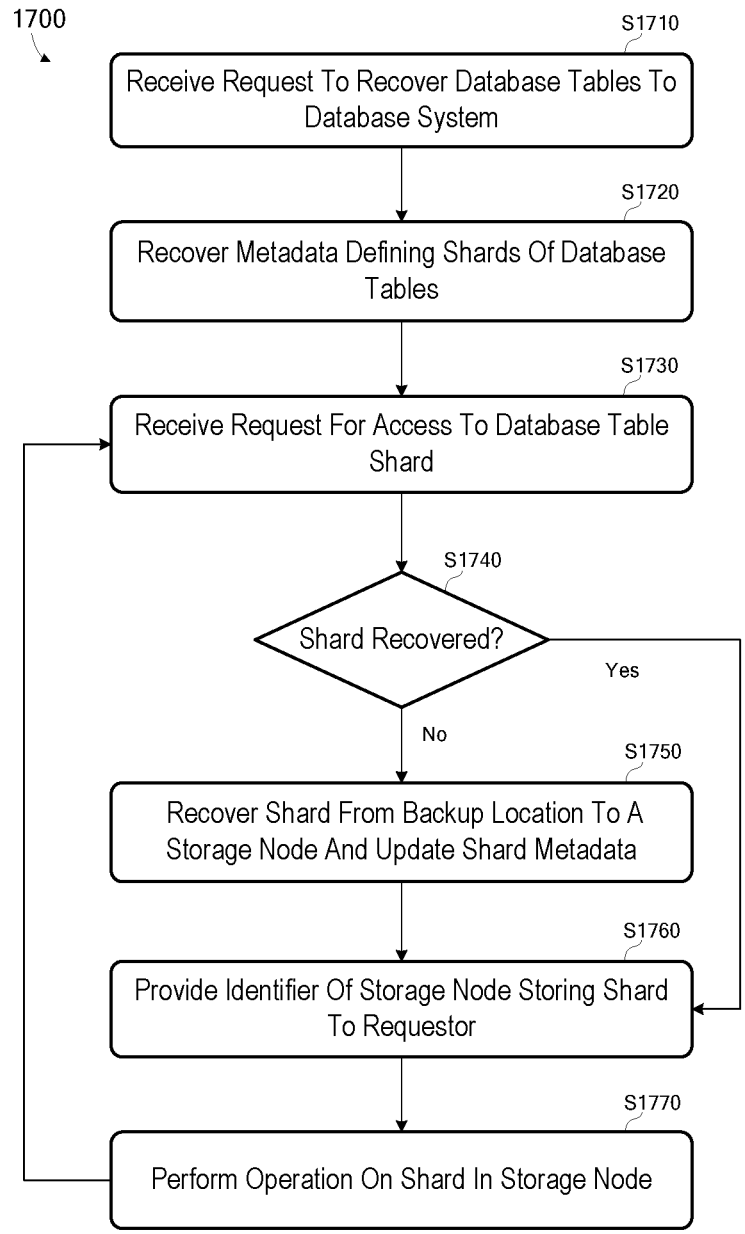
FIG. 17 is a flow diagram of a process to incrementally recover shard backups to storage nodes according to some embodiments.

FIG. 17 is a flow diagram of process 1700 to incrementally recover shard backups from backup locations to storage nodes according to some embodiments. At S1710, a request is received to recover database tables of a database to a database system. In response, metadata defining shards of database tables is recovered at S1720. S1720 assumes an implementation in which the database is associated with a root shard stored in storage layer 1620, and the root shard includes metadata defining each shard of each database table and their respective locations. Such a root shard implementation is not limited to an incremental recovery scenario and may be used in a system as described above with respect to FIGS. 15 and 16.

Figure 18A:
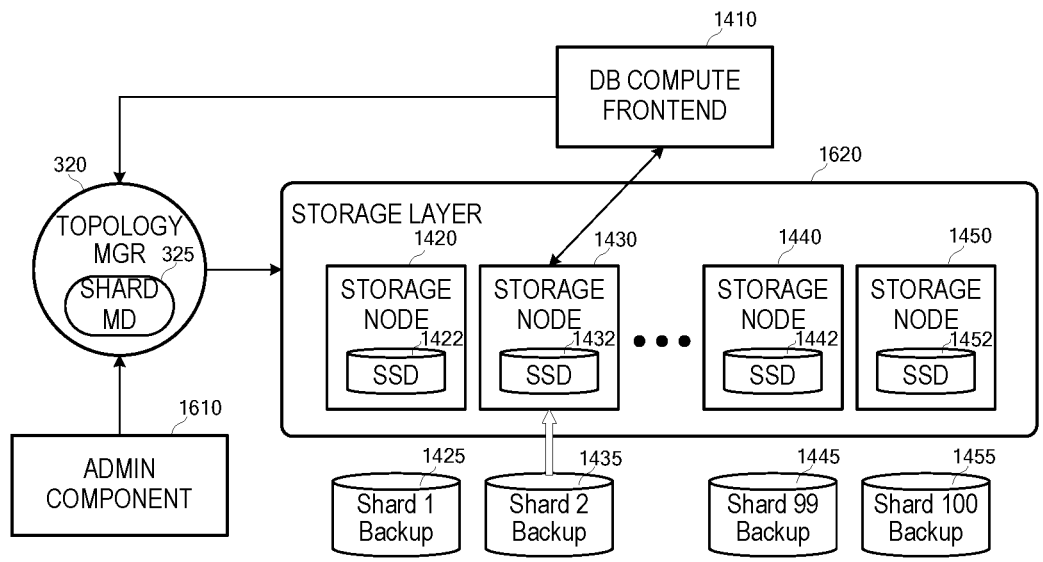
FIGS. 18a and 18b illustrate incremental recovery of shard backups to storage nodes according to some embodiments.

FIG. 18*a* illustrates administrator component 1610 from which topology manager 320 receives an instruction to recover the database at S1710. According to the present example, shard metadata 325 specifies the storage node (or nodes, in case shard replicas are employed) of the root shard of the database within storage layer 1620. The root shard is then recovered from a backup location corresponding to the specified storage node at S1720.

After S1720, storage layer 1620 may be made accessible to database compute frontends. Notably, this access exists prior to the recovery of any database table shards into storage layer 1620. Accordingly, access may be re-established in a near-instantaneous manner after receipt of the request to recover the database tables at S1710.

Next, at S1730, a request is received for access to a shard of a database table. As described above, the request may be received by topology manager 320. In response, topology manager 320 determines at S1740 and based on shard metadata 325 whether the shard has been recovered to storage layer 1620. If not, the shard is recovered at S1750 from the backup location specified by the metadata of the root shard to a storage node, as illustrated in FIG. 18a by the arrow from backup location 1435 to storage node 1430. Shard metadata 325 is also updated to specify the storage node in which the shard is now stored.

At S1760, topology manager 320 provides an identifier of the storage node to the requestor. Continuing the present example of FIG. 18a, the requestor (e.g., frontend 1410) uses the identifier to communicate with storage node 1430 to request an operation on the shard. The operation is performed on the shard in the storage node at S1770. Flow returns to S1730 to await another request for shard access.

It will be assumed that a request to access the same shard is received at S1730. It is therefore determined at S1740 that the shard has already been recovered to storage node 1430 based on shard metadata 325. Flow therefore proceeds to S1760 to provide an identifier of storage node 1430 to the requestor as described above. Accordingly, according to some embodiments, each shard of the database is recovered from a backup location only in response to a first request for access to the shard. A shard might never be recovered if no request for its access is received.

The request received at S1730 may request access to multiple shards of a database table and/or to other shards of several database tables. In such a case, S1740 through S1770 are performed in parallel for each shard of the request. Continuing the above example, a next request received at S1730 may request access to the first-requested shard and to another shard which has not yet been recovered. For the first-requested shard, flow proceeds to S1740, S1760 and S1770 to simply request an operation on the shard stored in storage node 1430 as illustrated in FIG. 18b.

Figure 18B:
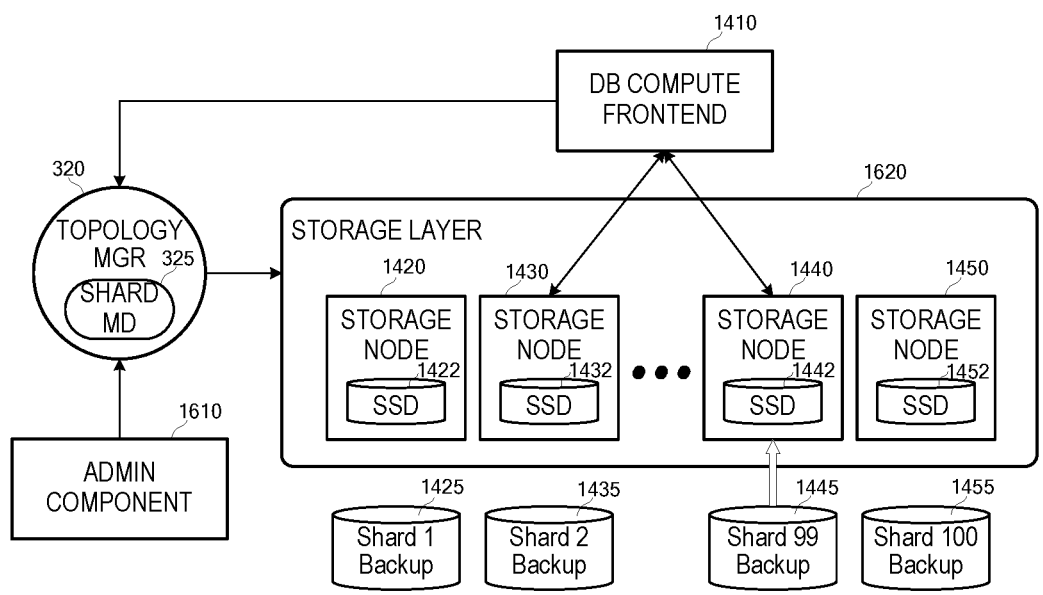

Assuming the backup data of the other shard of the request is stored in backup location 1445, flow proceeds from S1740 to S1750 to recover the shard to node 1440 as shown in FIG. 18b. Flow the continues to S1760 and S1770 to receive an identifier of storage node 1440 and to request an operation on the shard stored therein, as also illustrated in FIG. 18b.

Shards which are recovered to a respective storage node according to process 1700 may be replicated to two or more other storage nodes to provide the benefits described above. This replication may occur in response to recovery of the shard, asynchronously, in batches of recovered shards, etc.

The foregoing descriptions of FIGS. 14 through 18b are applicable to multi-tenant architectures in which storage layer 1620 stores shards of database tables of two or more tenants. In such architectures, shard metadata 325 may specify, for each shard, a tenant, a database table, a key range, a storage node (if any), and a backup location. Accordingly, a received request for recovery specifies a particular tenant database and only those shards associated with the database of the particular tenant are recovered as described with respect to processes 1500 or 1700.

Figure 19:
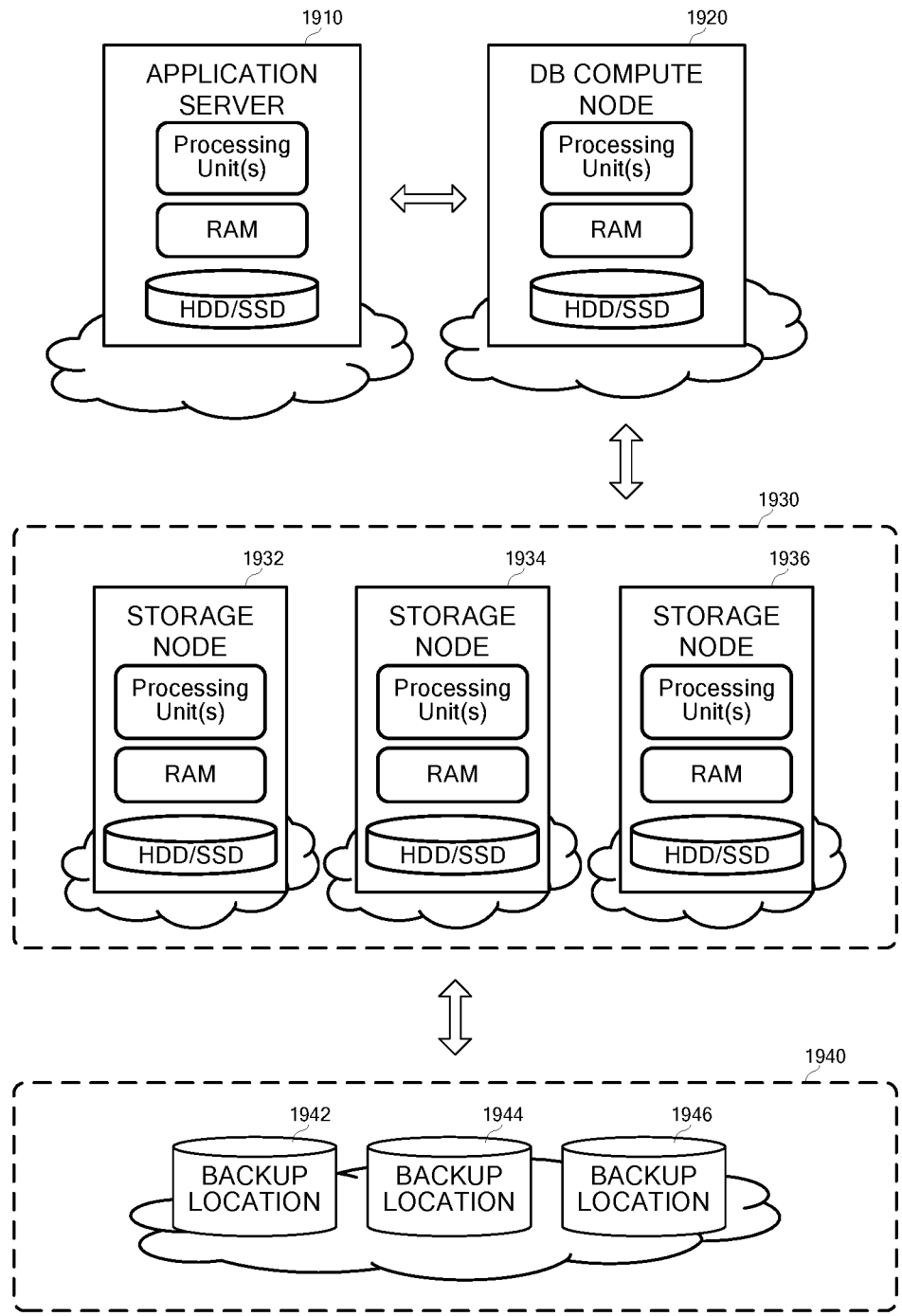
FIG. 19 is a block diagram of cloud-based virtual machines providing a database service according to some embodiments.

FIG. 19 is a block diagram of cloud-based environment according to some embodiments. Each component may be implemented using any suitable combination of hardware and software that is or becomes known. For example, each component may comprise a physical computer server or a virtual machine. Such virtual machines may reside in one or more public clouds providing self-service and immediate provisioning, autoscaling, security, compliance and identity management features.

Application server 1910 executes one or more applications which issue database queries. The applications may be accessed by users (not shown) who request information from the applications, thereby triggering issuance of the database queries. Application server 1910 transmits the queries to database compute node 1920, which executes a database instance (e.g., an indexserver). Based on the queries, the database instance instructs CRUD operations on data stored in storage nodes 1932, 1934 and 1936 of storage layer 1930.

The data is stored in storage nodes 1932, 1934 and 1936 of storage layer 1930 in any manner described above. For example, the data of a given table may be stored in shards distributed throughout storage nodes 1932, 1934 and 1936, and each shard may be replicated across multiple storage nodes. The data may include data of more than one tenant, where each shard of a given tenant is identified in metadata by a tenant identifier, a table identifier and a key range. Database compute node 1920 uses the metadata to determine the locations of shards on which operations are desired.

The shard data stored in storage nodes 1932, 1934 and 1936 of storage layer 1930 is periodically backed up to backup locations 1942, 1944 and 1946 of backup layer 1940. Upon receipt of a request to recover a database, the shards of the database are recovered from those backup locations of backup layer 1940 in which the corresponding backup data is stored. All the shards may be recovered in parallel as described with respect to FIG. 15 or incrementally based on requests for access as described with respect to FIG. 17.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a backup layer comprising one or more data storage devices, the backup layer comprising:
   a first backup location storing a backup of a first shard of a first database table of a database, the first shard including a first key range of the first database table; and
   a second backup location storing a backup of a second shard of the first database table, the second shard including a second key range of the first database table;
   a storage layer comprising a plurality of storage nodes comprising respective processing units and data storage devices; and
   a manager node storing metadata associating a new tenant with the first shard and the second shard,
   the manager node to:
   receive a first request to access the first shard from a requestor;
   in response to the first request:
   determine based on the metadata that the first shard is not stored in any one of the plurality of other storage nodes; and
   in response to the determination:
   issue an instruction to recover the first shard to a first storage node of the plurality of storage nodes from the first backup location; and
   return an identifier of the first storage node to the requestor.

2. A system according to claim 1, further comprising:
   the first storage node comprising a first processing unit and a first data storage device; and
   a second storage node comprising a second processing unit and a second data storage device,
   wherein, in response to an instruction to recover the database, the first shard is recovered to the first storage node from the first backup location and, in parallel, the second shard is recovered to the second storage node from the second backup location.

3. A system according to claim 2, wherein, in response to the instruction to recover the database, metadata is created associating a new tenant with the first shard and the second shard, the first shard with the first storage node, and the second shard with the second storage node.

4. A system according to claim 2, further comprising:
   a third storage node comprising a third processing unit and a third data storage device, the third data storage device storing a replica of the first shard; and
   a fourth storage node comprising a fourth processing unit and a fourth data storage device, the fourth data storage device storing a replica of the second shard.

5. A system according to claim 1, wherein, in response to the instruction to recover the database, metadata is created associating a new tenant with the first shard and the second shard, the first shard with the first storage node and the third storage node, and the second shard with the second storage node and the fourth storage node.

6. A system according to claim 1, wherein the manager node is to:
   receive a second request to access the first shard from the requestor; and
   in response to the second request:
   determine based on the metadata that the first shard is stored in the first storage node of the plurality of storage nodes; and
   in response to the determination that the first shard is stored in the first storage node, return the identifier of the first storage node to the requestor.

7. A computer-implemented method comprising:
   storing a backup of a first shard of a first database table of a database in a first backup location, the first shard including a first key range of the first database table;
   storing a backup of a second shard of the first database table in a first backup location, the second shard including a second key range of the first database table;
   receiving a first request to access the first shard from a requestor;
   in response to the first request:
   determining that the first shard is not stored in any of a plurality of storage nodes of a storage layer; and
   in response to the determination:
   issuing an instruction to recover the first shard to a first storage node of a plurality of storage nodes from the first backup location; and
   returning an identifier of the first storage node to the requestor.

8. A method according to claim 7, further comprising:
   receiving an instruction to recover the database; and
   in response to the instruction,
   recovering the first shard to a first storage node from the first backup location and, in parallel, recovering the second shard to a second storage node from the second backup location.

9. A method according to claim 8, further comprising:
   in response to the instruction to recover the database, creating metadata associating a new tenant with the first shard and the second shard, the first shard with the first storage node, and the second shard with the second storage node.

10. A method according to claim 8, further comprising:
    storing a replica of the first shard on a third storage node; and
    storing a replica of the second shard on a fourth storage node.

11. A method according to claim 10, further comprising:
    in response to the instruction to recover the database, creating metadata associating a new tenant with the first shard and the second shard, the first shard with the first storage node and the third storage node, and the second shard with the second storage node and the fourth storage node.

12. A method according to claim 7, further comprising:
    receiving a second request to access the first shard from the requestor; and
    in response to the second request:
    determining that the first shard is stored in the first storage node of the plurality of storage nodes; and
    in response to the determination that the first shard is stored in the first storage node, returning the identifier of the first storage node to the requestor.

13. A non-transitory computer-readable medium storing program code, the program code executable by a computing system to:
    store a backup of a first shard of a first database table of a database in a first backup location, the first shard including a first key range of the first database table;
    store a backup of a second shard of the first database table in a second backup location, the second shard including a second key range of the first database table;

receive a first request to access the first shard from a requestor;
in response to the first request:
  determine that the first shard is not stored in any of a plurality of storage nodes of a storage layer; and
  in response to the determination:
    issue an instruction to recover the first shard to a first storage node of a plurality of storage nodes from the first backup location;
    return an identifier of the first storage node to the requestor;
  receive a second request to access the first shard from the requestor; and
  in response to the second request:
    determine that the first shard is stored in the first storage node of the plurality of storage nodes; and
    in response to the determination that the first shard is stored in the first storage node, return the identifier of the first storage node to the requestor.

14. A medium according to claim 13, the program code executable by a computing system to:
  store a replica of the first shard on a third storage node;
  store a replica of the second shard on a fourth storage node; and
  in response to the instruction to recover the database, create metadata associating a new tenant with the first shard and the second shard, the first shard with the first storage node and the third storage node, and the second shard with the second storage node and the fourth storage node.

15. A medium according to claim 13, the program code executable by a computing system to:
  receive a second request to access the second shard from the requestor;
  in response to the second request:
    determine that the second shard is not stored in any one of the plurality of storage nodes of the storage layer; and
    in response to the determination that the second shard is not stored in any one of the plurality of storage nodes of the storage layer:
      issue a second instruction to recover the second shard to a second storage node of the plurality of storage nodes from the second backup location; and
      return an identifier of the second storage node to the requestor.

* * * * *